United States Patent
Nakamura et al.

[15] 3,663,077
[45] May 16, 1972

[54] BALL OR ROLLER BEARING ASSEMBLY

[72] Inventors: Toshio Nakamura; Hidetoshi Arii; Shozo Tatekawa; Sadaharu Kawai, all of Hitachi, Japan

[73] Assignee: Hitachi, Ltd., Tokyo, Japan

[22] Filed: Apr. 22, 1971

[21] Appl. No.: 136,549

Related U.S. Application Data

[63] Continuation of Ser. No. 795,226, Jan. 30, 1969, abandoned.

[52] U.S. Cl. ..........................................308/187
[51] Int. Cl. ......................................F16c 33/66
[58] Field of Search................................308/187

[56] References Cited

FOREIGN PATENTS OR APPLICATIONS 1,176,277  11/1958  France................................308/187

*Primary Examiner*—Martin P. Schwadron
*Assistant Examiner*—Frank Susko

[57] ABSTRACT

An antifriction bearing assembly and more particularly a ball or roller bearing assembly in which a pair of annular grease chambers are provided axially adjacent to an annular space formed between outer and inner rings and annular air chambers are further provided axially adjacent to the annular grease chambers, wherein the annular grease chambers are opened only to the annular space and the annular air chambers are communicated with each other by a passage bypassing the grease chambers.

25 Claims, 5 Drawing Figures

INVENTORS
TOSHIO NAKAMURA, HIDETOSHI ARII,
SHOZO TATEKAWA AND SADAHARU KAWAI

BY Craig and Antonelli

ATTORNEYS

BALL OR ROLLER BEARING ASSEMBLY

This is a continuation application of Ser. No. 795,226 filed Jan. 30, 1969, now abandoned.

The present invention relates to an antifriction bearing assembly and more particularly to a ball or roller bearing assembly comprising an inner ring mounted on a shaft, an outer ring mounted in a bearing box, and balls or rollers arranged between the inner and outer rings.

Heretofore, the bearing in small rotary machines, especially electric machines such as small electromotors, fans, compressors, etc. is in most cases constructed as a sealed ball or roller bearing having sealed grease chambers which are adapted to hold grease for the lubrication and to prevent the invasion of dust. In a typical structure of such kind of bearings, the grease chambers are formed by sealing an annular space formed between the outer and inner rings of the bearing in which the balls or rollers are arranged with seal plates applied to axial ends of said rings. This structure is generally effective to accomplish the above-mentioned purpose as long as it is applied to those bearings which have shaft diameters of not larger than about 50 mm, but is found not to be applicable to large or high speed rotary machine. The main reason of such limitation is the fact that in large or high speed rotary machines the above-mentioned structure is no longer effective to prevent the leakage of grease and the invasion of dust, and furthermore it causes inevitably damages and poor function of the bearing.

In large or high speed rotary machines, the grease in the bearing is generally subjected to violent agitation and a relatively high temperature caused by the frictional heat generation at the bearing, and therefore, the grease becomes too soft and of low viscosity to be proper for lubrication and furthermore to be effectively held within the grease chambers. This softening trouble of grease becomes more serious if the capacity of the grease chambers are smaller and insufficient.

To avoid the above-mentioned defect due to the insufficient capacity of the grease chambers, it is known to provide grease chambers of a sufficient capacity arranged axially adjacent to the annular space formed between the outer and inner rings of the ball or roller bearing. The structure of such a known bearing assembly will be explained with reference to FIG. 1 of the accompanying drawing.

FIG. 1 shows a partial axial section of said known bearing assemblies which are incorporated in, for example, an electromotor having a shaft 1 and a housing 2. In FIG. 1, two bearings, which are generally designated by reference numerals 3 and 4 are shown as, a roller bearing and a ball bearing, respectively, for the convenience of explanation, but it is a mere matter of design which kind of bearing is used at each position.

The bearings 3 and 4 are composed of outer rings 5 and 6, inner rings 7 and 8, and rollers 9 and balls 10, respectively. The inner rings 7 and 8 are mounted on the shaft 1 and are held at their determined axial positions by sleeves 11, 12 and 13, 14, respectively. On the other hand, the outer rings 5 and 6 are mounted in cylindrical bores 15a and 16a of hub members 15 and 16 of the housing 2, respectively, said hub members having substantially radial portions 15b and 16b which form end walls of bearing boxes for covering the inside axial ends of the bearings 3 and 4, respectively. The outside axial ends of the bearings 3 and 4 are closed by end covers 17 and 18, respectively, which form other end walls of bearing boxes and are also adapted to hold the bearings at determined axial position in the housing. Member 19 is an end ring threaded onto an end of the shaft 1.

On both axial sides of the bearings, or more particularly, the annular spaces formed between the outer and inner rings of the bearings, there are provided grease chambers 20, 21, 22 and 23, which are defined by walls of the bearing boxes and the sleeves 11 to 14 and are opening toward the annular spaces. The sleeves 11, 12 and 13 are adapted to rotate along annular rim portions of the end cover 17 and radial portions 15b and 16b, respectively, wherein the outer diameters of the sleeves are determined to be slightly smaller than the inner diameters of the cooperating annular rim portions so that minimum clearances are left between the sleeves and the rim portions which are necessary to avoid mechanical contact therebetween. The grease chambers are filled with grease, and the leakage thereof through the annular clearances is checked by a relatively large flow resistance of the grease filling the annular clearances, which is also checking the invasion of dust and water.

These bearing assemblies as shown in FIG. 1 have been used to a relatively large extent in large or high speed rotary machines. However, they can not be said to be sufficient in the function of preventing the leakage of grease and the invasion of dust and water. Especially in the bearing 3, through which the shaft 1 is penetrating the wall of the housing, there is a tendency that dust or water is inhaled through the annular clearances together with a stream of air which is caused by a pressure difference between the outside and inside of the housing and passes through the bearing during operation of the machine, whereby degradation of grease or damage to the bearing is apt to be caused. In large or high speed rotary machines, the air within the housing is in most cases circulated by a fan such as shown by 24 in FIG. 1 for the purpose of cooling, and furthermore a relatively intense vacuum may be generated in the region adjacent the bearing due to an intense evacuating action of members rotating at high speed, whereby the outside contaminated air is drawn into the housing through the bearing assemblies. Especially, the bearings of the machines such as electromotors of cars, which are operated in dusty condition can never be protected from the invasion of dust by this structure of bearing assembly.

Therefore, the grease in the bearing assembly of the above-mentioned structure can not complete its natural span of life before it is contaminated to such an extent that it can no longer function satisfactorily as lubricant, whereby the maintenance period is very shortened. Furthermore, the grease filled in the grease chambers is discharged and lost when the bearing assembly is disassembled for maintenance, and therefore, new grease must be supplemented or complete refilling thereof is necessary, for which a large amount of labor is consumed.

On the other hand, in recent years the capacity of rotary machines is rapidly increasing and the rotational speed thereof is also more heightened in spite of stronger requirements for a longer span of life of the machines as well as for a longer period of maintenance.

Accordingly, the main object of the present invention is to provide a bearing assembly which can be applied to large or high speed rotational machines and has a long period of maintenance with less troubles such as the leakage of grease or the invasion of dust or water.

This object is attained, according to the present invention, by an antifriction bearing assembly and more particularly a ball or roller bearing assembly comprising an inner ring mounted on a shaft, an outer ring mounted in a bearing box, and balls or rollers arranged between the inner and outer rings, characterized by grease holding chambers each being provided axially adjacent to an annular space formed between the inner and outer rings and opened only to the annular space.

According to an aspect of the present invention, the antifriction bearing assembly and more particularly the ball or roller bearing assembly is characterized by air chambers each being provided axially adjacent to the grease holding chamber at the remoter side thereof from the annular space and fluidly communicated with each other, whereby the air drawn from the outside and including dust or water is by-passed through the air chambers and the contamination of grease is effectively avoided.

According to another aspect of the present invention, the antifriction bearing assembly and more particularly the ball or roller bearing assembly is characterized in that the grease holding chambers are each formed of an annular through member having U-shaped cross section, said member having a flange portion extending radially outwards from the outer edge thereof, said flange portion being held between the outer ring and a bearing box, whereby the grease holding chambers and accordingly the grease filled therein can be held unchanged even when the bearing assembly is disassembled.

According to still another aspect of the present invention, the antifriction bearing assembly and more particularly the ball or roller bearing is characterized in that the inner surface of said outer edge of the annular trough member and the inner surface of the outer ring are arranged at the same level at least at the lowest portions thereof, whereby the grease filled in the grease holding chamber can be effectively used to the last drop thereof.

In the accompanying drawing.

Now, the present invention will be described in the form of some preferred embodiments with reference to the accompanying drawing.

Figure 1:
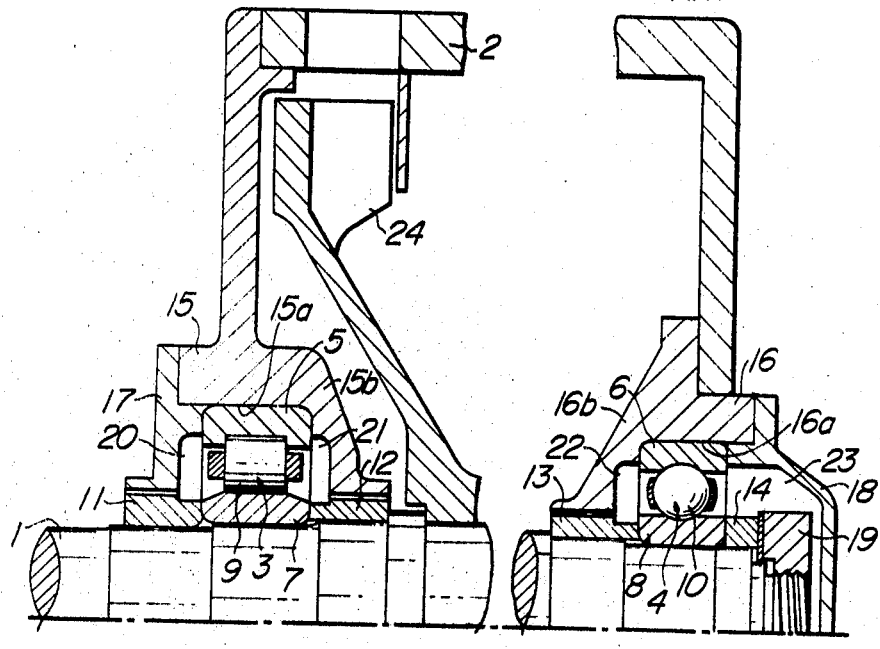
FIG. 1 is a partial axial section of known bearing assemblies for the purpose of explanation of the prior art.
Figure 2:
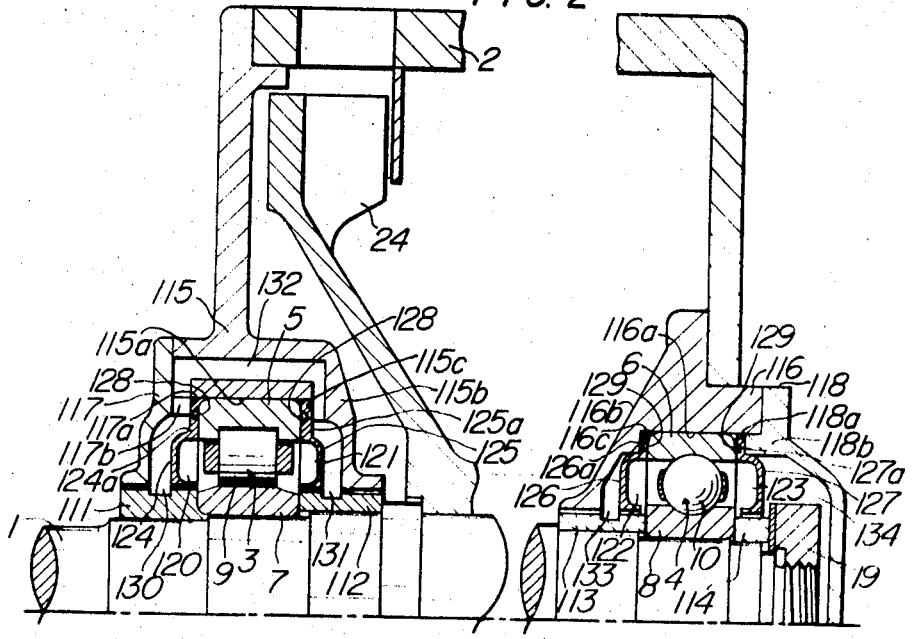
FIG. 2 is a partial axial section of embodiments of the bearing assembly according to the present invention.

Referring to FIG. 2, the bearing assemblies shown here correspond to the known bearing assemblies shown in FIG. 1, but are much improved by the application of the present invention. In FIG. 2, the same parts as those shown in FIG. 1 are designated by the same reference numerals as those in FIG. 1. Accordingly, the bearing assemblies shown in FIG. 2 are incorporated in, for example, the electromotor having the shaft 1 and the housing 2, and include the roller and ball bearings generally designated by reference numerals 3 and 4, which are including the outer rings 5 and 6, the inner rings 7 and 8, and the rollers 9 and the balls 10, respectively.

The inner rings 7 and 8 of the roller and ball bearings are mounted on the shaft 1 and are held at their determined axial positions by sleeves 111, 112 and 113, 114, respectively. The outer rings 5 and 6 are mounted in cylindrical bores 115a and 116a of hub members 115 and 116 of the housing 2, respectively. The hub members 115 and 116 have substantially radial portions 115b and 116b which form end walls of bearing covers for covering the inside axial ends of the bearings 3 and 4, respectively. The outside axial ends of the bearings 3 and 4 are closed by covers 117 and 118, respectively which form other end walls of the bearing covers.

On both axial sides of the spaces formed between the outer and inner rings 5 and 7 of the roller bearing 3 and between the outer and inner rings 6 and 8 of the ball bearing 4, there are provided grease holding chambers 120, 121, 122 and 123, which are defined by annular trough members 124, 125, 126 and 127, respectively. The annular trough members 124, 125, 126 and 127 have flange portions 124a, 125a, 126a and 127a, respectively, each extending radially outwards from the outer edge thereof. The annular trough members 124 and 125 may be the same member which are however arranged in opposite directions. Similarly, the annular trough members 126 and 127 may be the same member which are arranged in opposite directions. The annular trough member 124 is mounted by the flange portion 124a being held between an end face 117a of an annular projection 117b of the cover 117 and an axial end wall of the outer ring 5, while the annular trough member 125 is mounted by its flange portion 125a being held between an annular shoulder 115c of the radial portion 115b and the other axial end wall of the outer ring 5. Similarly, the annular trough member 126 is mounted by its flange portion 126a being held between an annular shoulder 116c of the hub member 116 and an axial end wall of the outer ring 6, while the annular trough member 127 is mounted by its flange portion 127a being held between an end face 118a of an annular projection 118b of the cover 118 and the other axial end wall of the outer ring 6.

Between, the flange portions 124a and 125a and the outer ring 5, there are provided annular packings 128 so that the grease softened at a high temperature due to the frictional heat generation does not leak out through incidental clearances formed between the flange portions and the outer ring. Similarly, annular packings 129 are provided between the flange portions 126a and 127a and the outer ring 6.

On both axial sides of the annular trough members 124 and 125, there are provided annular air chambers 130 and 131, which are defined by the outside walls of the annular trough members 124 and 125 and the inside walls of the cover 117 and the radial portion 115b, said inside walls being spaced from said outside walls. The air chambers 130 and 131 are communicated with each other through air passages 132 which are properly distributed along the circumference of the bearing and are extending through the annular projection 117b and the hub member 115. On both axial sides of the annular trough members 126 and 127, there are also provided air chambers 133 and 134.

In the bearing assemblies as shown in FIG. 2, the interiors of the grease holding chambers 120–123 are isolated from the rotating sleeves 111–114 by the inner peripheries of the annular U-shaped trough members, whereby the violent agitation of grease which is suffered in the conventional bearing assemblies as shown in FIG. 1 is avoided. Furthermore, since the grease filled in the grease holding chambers is held by the annular trough members, the grease is not discharged and lost even when the bearing assemblies are disassembled for maintenance. On the other hand, the air drawn through the annular clearance between the sleeve 111 and the cover 117 is led through the air chamber 130, the air passages 132 and the air chambers 131 to the interior of the housing 2, thus by-passing the grease-filled area of the bearing, whereby the contamination of grease by the dust or water entrained by the air is effectively avoided. In case of the bearing 4 which is positioned at the closed end of the housing, there is no danger that a contaminated air is drawn from the outside, and therefore there is no necessity of providing the air by-pass passages as 132. However, the air chamber 133 is still effective in the fact that it catches the dust which has strayed in through the annular clearance between the sleeve 113 and the radial portion 116b of the hub member 116.

Figure 3:
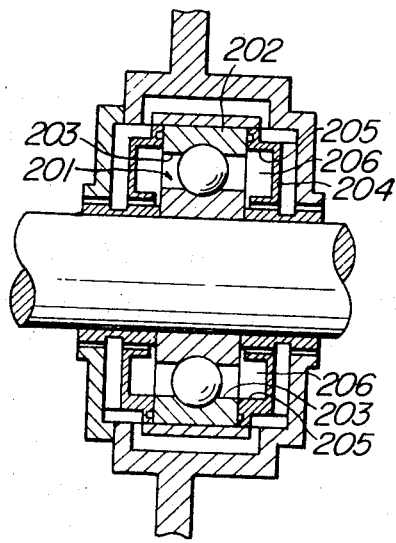
FIG. 3 is an axial section of still another embodiment of the bearing assembly according to the present invention.
Figure 4:
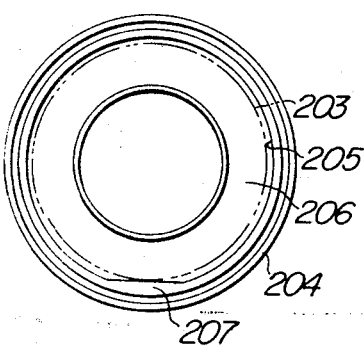
FIG. 4 is a cross section of the annular trough member in the bearing assembly shown in FIG. 3.
Figure 5:
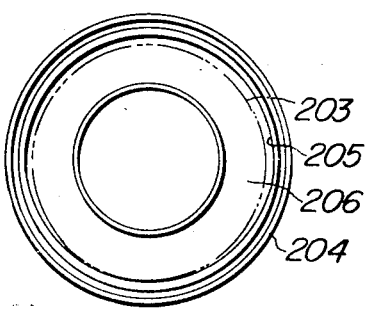
FIG. 5 is a cross section of another annular trough member replaceable for the annular trough member shown in FIG. 4.

As it will be understood from the fact that the grease holding chambers 120–123 or the annular U-shaped trough members 124–127 are opened only to the annular spaces formed between the outer and inner rings of the bearings, in which the rollers and balls are arranged for rolling, the grease filled in the grease holding chambers is wholly effectively utilized for the lubrication of the bearings. However, the completeness of the utilization is more certainly guaranteed by the structure as shown in FIGS. 3 to 5. In a bearing assembly shown in FIG. 3, which is another embodiment of the present invention, the inner surface 203 of an outer ring 202 of a roller bearing 201 is arranged at the same level as the inner surface 205 of the outer edge of an annular U-shaped trough member 204 at least at the lowest portions of both said surfaces. By this structure the grease filled in grease holding chambers 206 can be supplied to the rolling surfaces of the balls and the races of the bearing to the last drop of the grease without any stagnation of grease at the lowest area of said chambers.

The accordance of said surfaces 203 and 205 at the lowest portions thereof is accomplished, according to an embodiment shown in FIG. 4, by forming a horizontal land 207 at the inner surface 205 of the annular trough member 204, or according to another embodiment shown in FIG. 5, by displacing the center of the annular trough member 204 from that of the bearing 201 so that the surfaces 203 and 205 are positioned at the same level at the lowest portions thereof. In still another and most primitive embodiment, the accordance of the lowest portions of the surfaces 203 and 205 can be accomplished by forming the both surfaces to be of the same diameter. However, the last embodiment has a disadvantage that the volume of the lubricant holding chambers is limited to be relatively smaller than those in the embodiments shown in FIGS. 4 and 5.

The annular trough members of this invention may be made of metals or thermoplastic synthetic resins which have superior heat resisting characteristics. For example, polyethylene terephthalate or polyamide resin reinforced by glass fibers are preferably used for the annular trough members which are to be continuously operated at above 100° C. Since these resins are somewhat elastic and are tenacious by being reinforced by glass fibers, the annular trough members made of these resins can be mounted so tightly between the outer rings and the bearing covers that it becomes unnecessary to provide the annular packings at the holding surfaces.

We claim:

1. An anti-friction bearing assembly comprising an inner ring mounted on a shaft, an outer ring mounted in a bearing cover, balls or rollers arranged between the inner and outer rings to permit rotation of one ring with respect to the other, annular trough members disposed axially adjacent to the annular space between said inner and outer rings on either side thereof so as to form annular lubricant holding chambers open only toward said balls or rollers, air chambers each being provided axially adjacent to said lubricant holding chambers at the outer side thereof from said annular space, and an air passage interconnecting said air chambers.

2. An anti-friction bearing assembly as defined in claim 1, wherein said trough members have a U-shaped cross-section and are provided with a radial flange portion held between the axial end wall of the outer ring and said bearing cover.

3. An anti-friction bearing assembly as defined in claim 2, wherein an annular seal is interposed between the radial flange portion of each trough member and said outer ring.

4. An anti-friction bearing assembly as defined in claim 1, wherein the inner surface of said outer edge of the annular trough member and the inner surface of said outer ring are arranged at the same level at least at the lowest portions thereof.

5. An anti-friction bearing assembly as defined in claim 1, wherein said annular trough members are made of a synthetic resinous substance.

6. An anti-friction bearing assembly as defined in claim 1, wherein said air passage extends through said bearing cover around said outer ring.

7. An anti-friction bearing assembly as defined in claim 6, wherein said air chambers are annular chambers defined primarily by said annular trough members and radial portions of said bearing cover.

8. An anti-friction bearing assembly as defined in claim 7, wherein said trough members have a U-shaped cross-section and are provided with a radial flange portion held between the axial end wall of the outer ring and said bearing cover.

9. An anti-friction bearing assembly as defined in claim 8, wherein an annular seal is interposed between the radial flange portion of each trough member and said outer ring.

10. An anti-friction bearing assembly as defined in claim 1, wherein said air chambers are annular chambers defined primarily by said annular trough members and radial portions of said bearing cover.

11. An anti-friction bearing assembly as defined in claim 10, wherein the inner surface of said outer edge of the annular trough member and the inner surface of said outer ring are arranged at the same level at least at the lowest portions thereof.

12. An anti-friction bearing assembly as defined in claim 11, wherein said annular lubricant holding chambers are eccentrically disposed with respect to the annular space between said inner and outer rings.

13. An anti-friction bearing assembly as defined in claim 11, wherein said annular lubricant holding chambers have a larger outer diameter than the annular space between said inner and outer rings and are concentric therewith, at least one of said annular trough members being provided with a chordal land at the level of the outer diameter of said annular space between said inner and outer rings.

14. An anti-friction bearing assembly comprising an inner ring mounted on a shaft, an outer ring mounted in a bearing cover, balls or rollers arranged between the inner and outer rings to permit rotation of one ring with respect to the other, said bearing cover having substantially radially extending portions defining enclosed annular air chambers axially adjacent said inner and outer rings on either side thereof, and annular trough members disposed in each air chamber directly adjacent said inner and outer air chamber directly adjacent said inner and outer rings so as to form annular lubricant holding chambers occupying only part of said air chambers and communicating only with the annular space between said inner and outer rings, said air chambers being interconnected by an air passage.

15. An anti-friction bearing assembly as defined in claim 14, wherein said air passage extends through said bearing cover around said outer ring.

16. An anti-friction bearing assembly as defined in claim 15, wherein said trough members have a U-shaped cross-section and are provided with a radial flange portion held between the axial end wall of the outer ring and said bearing cover.

17. An anti-friction bearing assembly as defined in claim 16, wherein an annular seal is interposed between the radial flange portion of each trough member and said outer ring.

18. An anti-friction bearing assembly as defined in claim 14, wherein the inner surface of said outer edge of the annular trough member and the inner surface of said outer ring are arranged at the same level at least at the lowest portions thereof.

19. An anti-friction bearing assembly as defined in claim 18, wherein said annular lubricant holding chambers are eccentrically disposed with respect to the annular space between said inner and outer rings.

20. An anti-friction bearing assembly as defined in claim 18, wherein said annular lubricant holding chambers have a larger outer diameter than the annular space between said inner and outer rings and are concentric therewith, at least one of said annular trough members being provided with a chordal land at the level of the outer diameter of said annular space between said inner and outer rings.

21. An anti-friction bearing assembly comprising an inner bearing ring mounted on a shaft, a bearing cover including an annular hub member having an annular cylindrical recess, an outer ring mounted in said recess, balls or rollers arranged between the inner and outer rings to permit rotation of said shaft with respect to said bearing cover, said hub members having substantially radial portions extending toward said shaft to form enclosed annular spaces on either side of said inner and outer rings defining bearing boxes, annular trough members disposed in said bearing boxes axially adjacent to the annular space between said inner and outer rings so as to form annular lubricant holding chambers occupying only a part of said bearing boxes and communicating only with said annular space, and an air passage through said hub member interconnecting said bearing boxes.

22. An anti-friction bearing assembly as defined in claim 21, wherein said trough members have a U-shaped cross-section and are provided with a radial flange portion held between said axial end wall of the outer ring and said bearing cover.

23. An anti-friction bearing assembly as defined in claim 22, wherein an annular seal is interposed between the radial flange portion of each trough member and said outer ring.

24. An anti-friction bearing assembly as defined in claim 21, wherein said annular trough members are made of a synthetic resinous substance.

25. An anti-friction bearing assembly as defined in claim 21, wherein at least one of said substantially radial portions of said hub member is provided as a removable cover.

* * * * *